Sept. 23, 1969    A. S. ROWLEY    3,468,065
MACHINES FOR SHARPENING ROTARY CUTTERS
Filed Sept. 12, 1966    5 Sheets-Sheet 1

INVENTOR
ALAN STAMFORD ROWLEY
BY Norris + Bateman
Attys

Sept. 23, 1969  A. S. ROWLEY  3,468,065
MACHINES FOR SHARPENING ROTARY CUTTERS
Filed Sept. 12, 1966  5 Sheets-Sheet 3
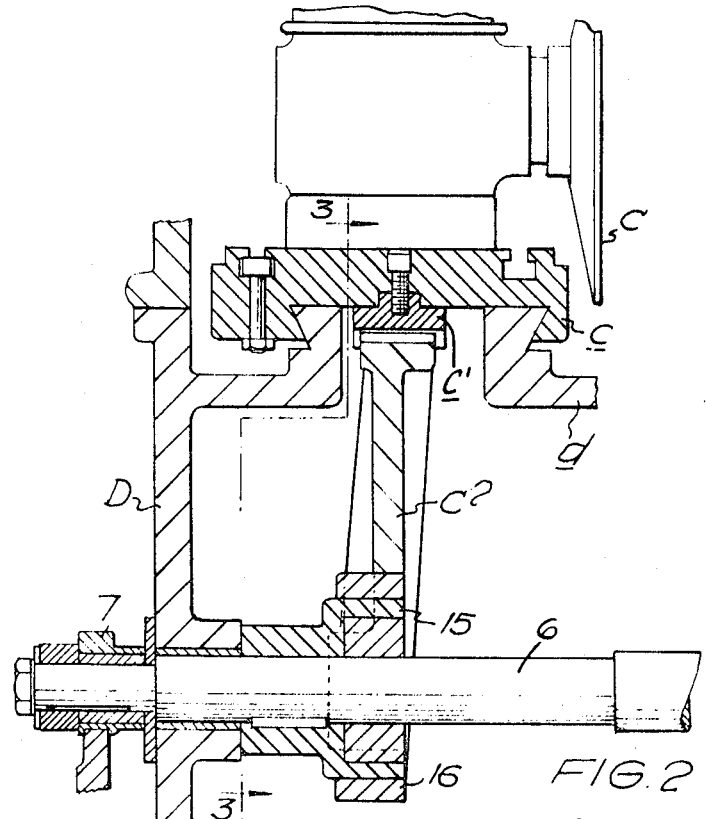
FIG. 2
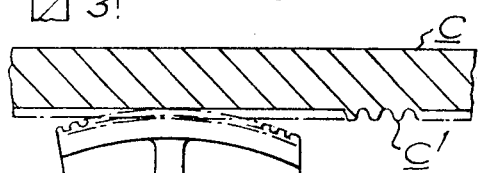
FIG 3
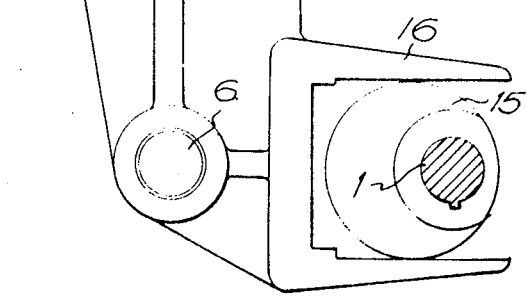
INVENTOR
ALAN STAMFORD ROWLEY
BY Norris + Bateman
attys

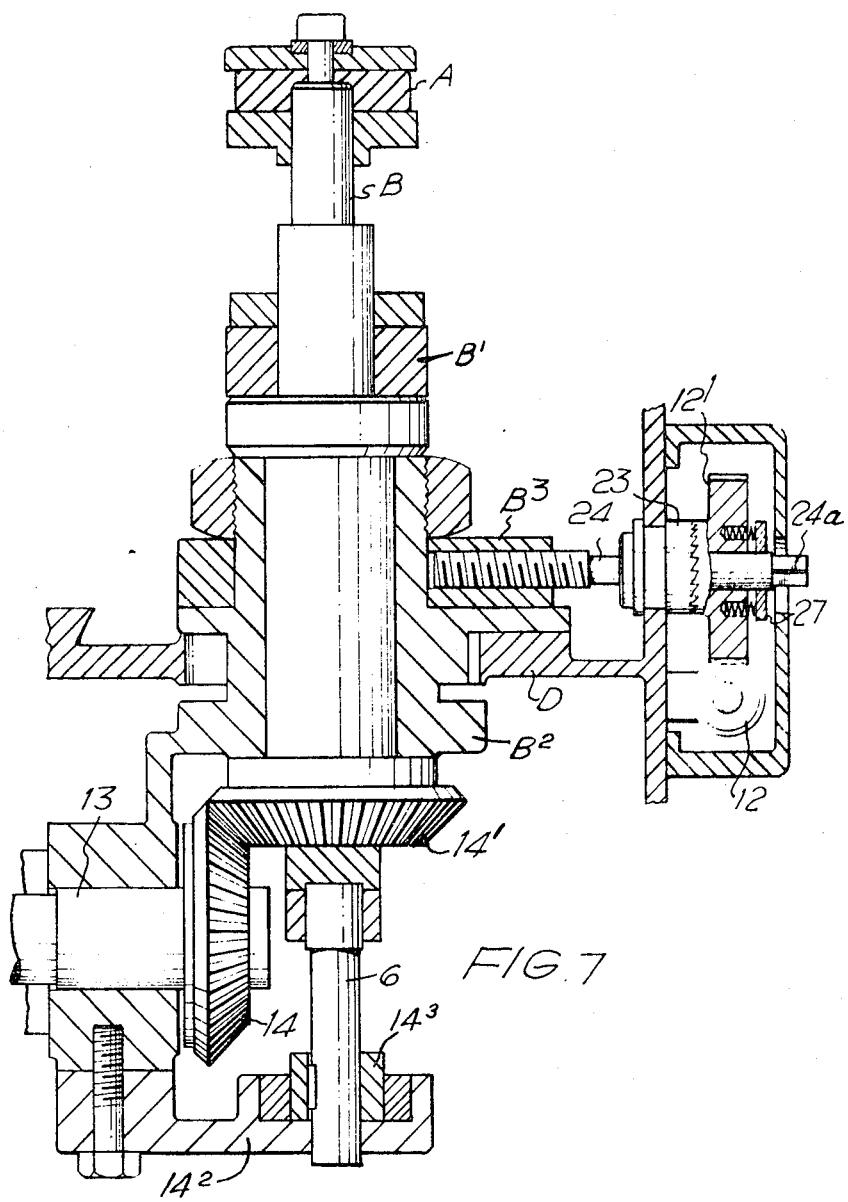

United States Patent Office 3,468,065
Patented Sept. 23, 1969

3,468,065
MACHINES FOR SHARPENING ROTARY CUTTERS
Alan Stamford Rowley, The White Cottage, Castle Hill, Prestbury, Chester, England
Filed Sept. 12, 1966, Ser. No. 578,527
Claims priority, application Great Britain, Sept. 30, 1965, 41,500/65
Int. Cl. B24b 7/00, 9/00, 5/00
U.S. Cl. 51—37                    5 Claims

ABSTRACT OF THE DISCLOSURE

A machine for grinding and sharpening the cutting faces of the teeth of milling and similar cutters having integral cutting teeth comprises a frame, a pedestal slidably adjustably mounted on the frame and carrying a rotatable arbour mounting the cutter to be ground, a one-tooth mechanism mounted on the frame for rotating the arbour to reposition the cutter after each tooth grinding operation, a driven grinding wheel head mounted on a reciprocating table and moved back and forth to dispose the grinding wheel in operative engagement with the cutter by a pivoted quadrant in timed relation with the rotational positioning of the cutter, and a positive lock for holding the cutter stationary during the grinding operation.

---

This invention relates to improvements in machines for grinding and sharpening the cutting faces of the teeth of milling and similar cutters having integral cutting teeth, the machine being of the type in which the cutter to be ground and sharpened is mounted on an arbour carried in a frame supporting a grinding wheel head, the arbour being automatically rotated one tooth after each grinding operation to bring a succeeding tooth into the grinding position.

My U.S. Patent No. 3,141,266 dated July 21, 1964, describes a machine of the type referred to for grinding and sharpening the rotary cutting faces of the teeth of milling and similar cutters comprising a crank mechanism for imparting a horizontal to-and-fro motion to the grinding wheel, and a single tooth pinion mechanism for automatically rotating the milling or like cutter one tooth after each grinding operation.

The object of the present invention is to improve the mechanism for imparting a to-and-fro motion to the grinding wheel and the advancing or feeding movement for the cut of the grinding wheel and to provide a locking pawl for the mechanism driven intermittently by a single tooth pinion mechanism.

According to the invention a grinding and sharpening machine as hereinbefore referred to comprises a spur quadrant engaging a rack affixed to the underside of the table on which the grinding wheel head is mounted, the quadrant being rocked by a cam on the drive shaft to impart a to-and-fro movement to the table.

The invention will be described with reference to the accompanying drawings:

FIG. 2 is an elevation also partly in section at right angles to FIG. 1.

FIG. 3 is a section on line 3—3 FIG. 2 of the quadrant for reciprocating the table supporting the grinding wheel head.

FIG. 7 is a vertical section of the drive for the arbour carrying the cutter to be ground.

A rotary milling or similar cutter A to be ground is mounted on a vertical arbour B. A grinding wheel C for sharpening the teeth of the cutter A is mounted on a grinding wheel head on a sliding table $c$ and driven by a motor $C^1$.

The under side of the table $c$ is grooved to engage in a slide $d$ formed in the frame D, rack teeth $c^1$ being provided on the table to engage teeth on a quadrant $C^2$ mounted on a stub shaft 6 as shown in FIGURE 2. The rack is bolted to the underside of the table $c$.

Figure 1:
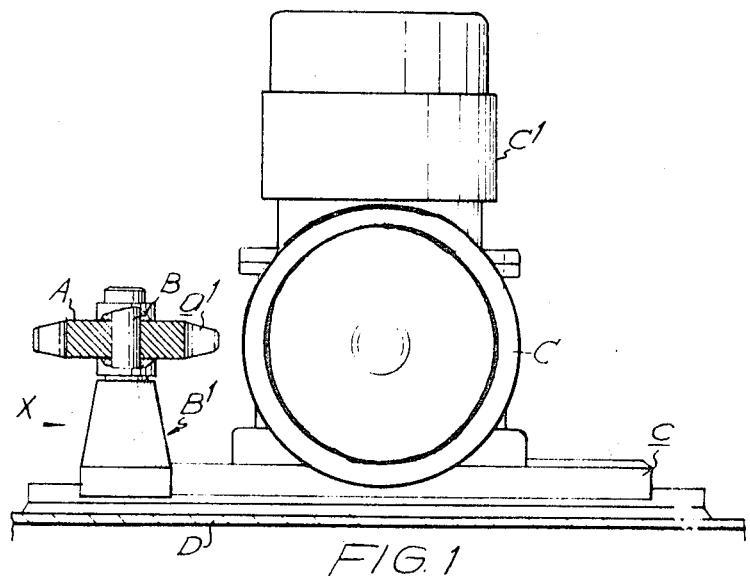
FIG. 1 is a side view partly in section showing the grinding wheel head slide and cutter to be sharpened.
Figure 4:
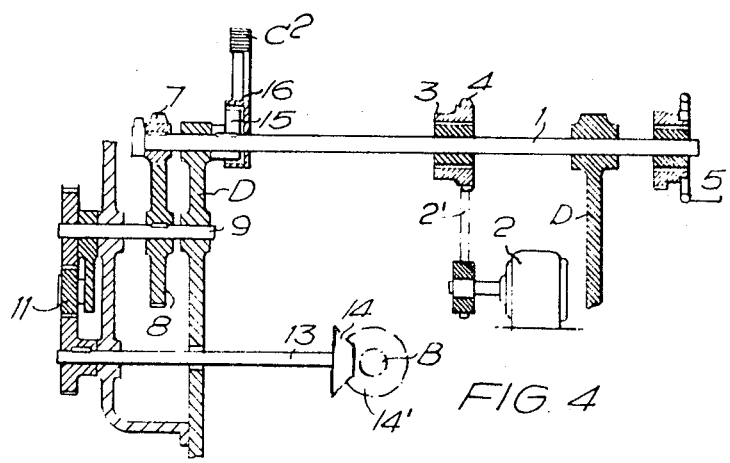
FIG. 4 is a diagrammatic plan showing the gearing for traversing the grinding wheel and rotating the cutter to be sharpened.

Referring to FIGURE 4, a drive shaft 1 is driven by a motor 2 through a chain 2 engaging a chain wheel 4 mounted on a free wheel mechanism 3 on the drive shaft 1. A hand wheel 5 is also mounted on the drive shaft on a free wheel mechanism for initial rotation thereof when setting up the cutter A for grinding.

Figure 1A:
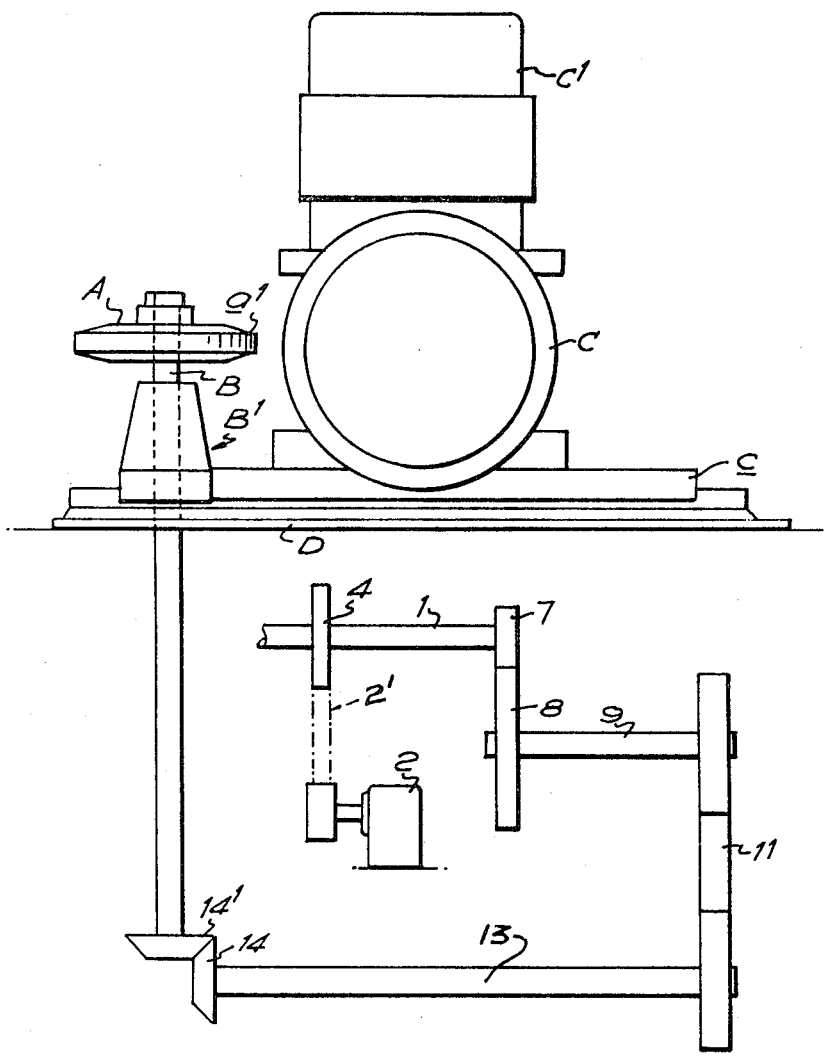
FIG. 1a is a relatively diagrammatic view showing the cutter drive.

The drive shaft 1 is journalled in the machine frame D, and has mounted thereon a one tooth pinion 7 engaging with a pinion 8 having for example 18 teeth affixed to an index plate on a spindle 9 carrying one member of a gear train 11. Gear train 11 as shown in FIGURE 1a drives a bevel pinion 14 on a spindle 13 through which the drive is transmitted to the arbour B rotating the cutter A to be ground by the second bevel pinion $14^1$ on an arbour B. The lower end of the arbour B (see FIGURE 7) extends through a bracket $14^2$ and carries a sprag clutch $14^3$ keyed onto the arbour to prevent strain being transmitted through the gear train when clamping up the cutter A to be ground.

A cam 15 (see FIGURES 3 and 4) is keyed on to the drive shaft 1 and this cam engages a cam rocker 16 integral with the quadrant $C^2$ to impart a rocking movement thereto to traverse the reciprocating table $c$.

Figure 5:
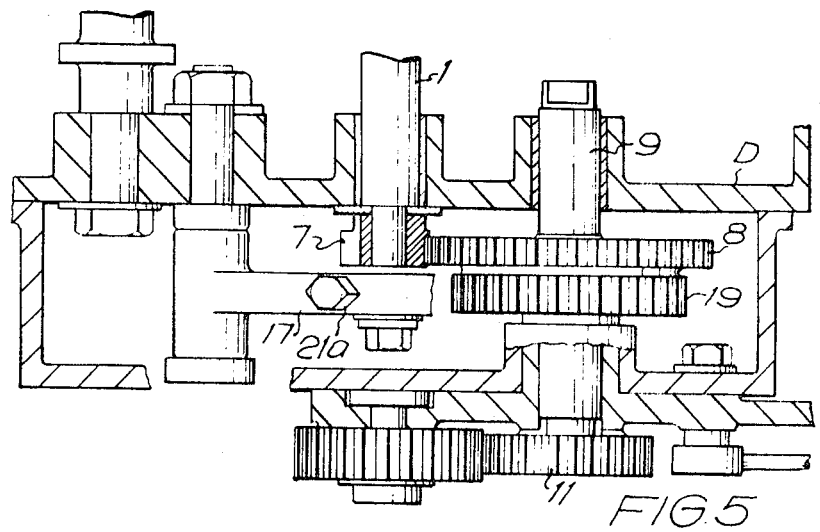
FIG. 5 is a detail plan view of the pawl mechanism for locking the drive to the arbour carrying the cutter to be ground.
Figure 6:
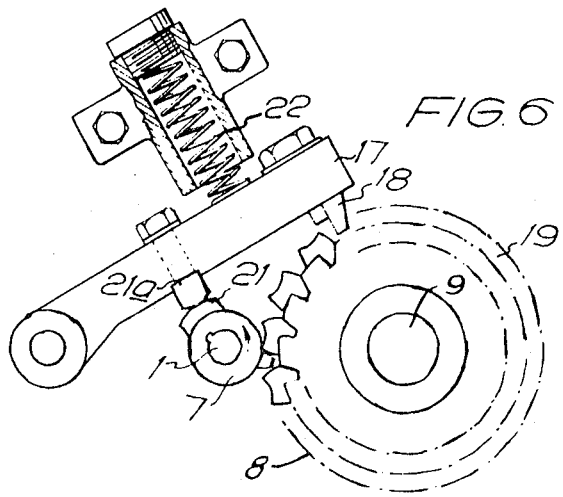
FIG. 6 is a side elevation of the pawl mechanism shown in FIG. 5.

The pinion 8 is rotated one tooth by the one tooth pinion 7 on each revolution of the drive shaft 1 and during the remainder of the rotation of the shaft 1 the pinion 8 is locked by a pawl mechanism shown in FIGURES 5 and 6. A pawl lever 17 carrying a pawl 18 is pivoted on the frame D, the pawl 18 engaging a toothed ratchet wheel 19. A cam 21 on the drive shaft 1 engages an adjustable cam follower 21a on the lever 17 to lift the pawl 18 as the tooth of the one tooth pinion 7 approaches the pinion 8, against the action of a spring 22. The locking of the pawl lever 17 prevents the rotation of the arbour B during the grinding operation.

The grinding wheel C is advanced during the grinding of the flanks of the teeth of the cutter A by the quadrant $C^2$ and rack $c^1$. After each tooth of the cutter A has been ground the cutter is advanced one tooth by the pinion 7 and the grinding operation repeated on a succeeding tooth, the table $c$ being moved in the reverse direction after each grinding operation to withdraw the grinding wheel C from the wheel A.

In order to apply the required feed or cut to the cutting faces being sharpened the pedestal $B^2$ (FIGURE 7) carrying the arbour B is moved towards the grinding head by rotating the worm 12 which has a hand-wheel (not shown). The worm 12 in turn rotates the worm-wheel $12^1$ which is integral with a ratchet clutch 23 (FIG. 7) and may be rotated by shaft extension $24a$.

The engaging ratchet clutch 23 is keyed on the spindle 24 (which runs freely in the frame D) and is threaded to engage with a nut $B^3$ which is integral with the pedestal B², rotation of the spindle 24 advancing the pedestal and arbour B towards the grinding head.

In order to retract the arbour B when changing a grinding wheel C the spindle 24 is rotated in the opposite direction by hand and in order to avoid a reverse rotation of the worm gear the ratchet teeth separate against the action of a spring plate 27.

In operation the milling or similar cutter A to be ground is mounted on the arbour B and a tooth $a^1$ thereon is ground on the "in" stroke by the grinding wheel C which is traversed on the table $c$ by the quadrant C². During the "out" stroke of the table $c$ the single tooth pinion 7 through the gear train 11 rotates the arbour B one tooth of the cutter A and the grinding operation is repeated on a succeeding tooth. The required feed being imparted as hereinbefore described.

What I claim is:

1. A machine for grinding and sharpening the cutting faces of the teeth of milling and similar cutters comprising a frame, a rotatable arbour on which the cutter to be ground is mounted, mechanism on the frame operably connected for rotating the arbour to reposition said cutter after each tooth grinding operation, means for driving said mechanism, a grinding wheel head, a reciprocatable table on which said head is mounted, a rack mounted on said table, a pivoted toothed element engaging said rack, a grinding wheel mounted on said head, means for rotating said grinding wheel, a driven shaft, cam means on said shaft, and motion transmitting means operably connecting said cam means to said element to rock said element to impart a to-and-fro movement to the table whereby said grinding head is periodically moved into grinding relation with said cutter in synchronism with rotatable positioning of said cutter by said mechanism.

2. A machine for grinding and sharpening the cutter faces of the teeth of milling and similar cutters as defined in claim 1, in combination with means for locking the rotary movement of the arbour during the tooth grinding operation.

3. A machine for grinding and sharpening the cutting faces of the teeth of milling and similar cutters as defined in claim 1, in combination with a pawl intermittently operated from said shaft for locking said arbour against rotation during the grinding operation.

4. A machine for grinding and sharpening the cutting faces of the teeth of milling and similar cutters as defined in claim 1, in combination with adjustment means for resetting said grinding head for replacement of a grinding wheel thereon.

5. A machine for grinding and sharpening the cutting faces of the teeth of milling and similar cutters as defined in claim 1, in combination with a pedestal mounting said arbour and adjustably slidably mounted on said frame, and means for adjusting the position of said pedestal on said frame.

References Cited

UNITED STATES PATENTS

| | | | |
|---|---|---|---|
| 3,007,286 | 11/1961 | Marindin | 51—216.5 X |
| 1,831,869 | 11/1931 | Kessler. | |
| 2,136,266 | 11/1938 | Reinecker | 51—52 |
| 2,968,133 | 1/1961 | Reichardt | 51—216.5 X |

JAMES L. JONES, Primary Examiner

U.S. Cl. X.R.

51—52